(12) United States Patent
Brownell et al.

(10) Patent No.: US 9,845,864 B2
(45) Date of Patent: Dec. 19, 2017

(54) PLANET CARRIER, OUTPUT GEAR AND SPINDLE ASSEMBLY

(71) Applicant: DEERE & COMPANY, Moline, IL (US)

(72) Inventors: Douglas K Brownell, Bartlesville, OK (US); Kyle K McKinzie, Altamont, KS (US)

(73) Assignee: Deere & Company, Moline, IL (US)

( * ) Notice: Subject to any disclaimer, the term of this patent is extended or adjusted under 35 U.S.C. 154(b) by 21 days.

(21) Appl. No.: 15/009,296

(22) Filed: Jan. 28, 2016

(65) Prior Publication Data

US 2017/0219086 A1    Aug. 3, 2017

(51) Int. Cl.
*F16H 57/08*    (2006.01)

(52) U.S. Cl.
CPC .................................. *F16H 57/082* (2013.01)

(58) Field of Classification Search
None
See application file for complete search history.

(56) References Cited

U.S. PATENT DOCUMENTS

| 3,667,324 A * | 6/1972 | Laing ................... F16H 57/082 475/159 |
| 8,323,143 B2 | 12/2012 | Schoon |
| 2014/0031165 A1* | 1/2014 | Kubota .................... F16H 1/28 475/331 |
| 2015/0111685 A1* | 4/2015 | Biermann ............... F16H 48/11 475/248 |

FOREIGN PATENT DOCUMENTS

DE    102013222731 A1 *  5/2015  ........... F16H 57/082

* cited by examiner

*Primary Examiner* — Dirk Wright
(74) *Attorney, Agent, or Firm* — Lorenz & Kopf, LLP

(57) ABSTRACT

In accordance with an example embodiment, a transmission subassembly includes a planet carrier body releasably fixed to an output gear body. The planet carrier body and the output gear body are mounted for rotation about a horizontal axis along which joined sections of an input shaft is located, with one shaft section extending axially through a hollow spindle and carrying a sun gear at a location immediately adjacent a threaded end of the spindle, with the sun gear being meshed with planet gears carried by the planet carrier body. A ring nut is screwed onto the threaded spindle end and serves to properly set a pair of tapered roller bearings that support the output gear body for rotation about the spindle together with the carrier body about the rotation axis. Prior to being assembled into the transmission, the subassembly can be rotatably balanced.

13 Claims, 4 Drawing Sheets

PLANET CARRIER, OUTPUT GEAR AND SPINDLE ASSEMBLY

RELATED APPLICATIONS

There are no related applications.

TECHNICAL FIELD

The invention refers to a planet carrier of a planetary gear set assembled together with an output gear and a spindle.

BACKGROUND

Planetary transmissions are typically designed to provide multiple speed ranges while remaining compact and power dense. In off-highway equipment, there is often a need to have an output from the transmission that can be applied to both front and rear wheel drive axles. This is usually accomplished with a drop gear train that leads to an output shaft. Trying to mate gearing of a planetary gear set with gearing of an input shaft of a drop gear train in an efficient special manner is difficult.

High speed planetary transmissions typically have trouble with noise, vibration and harshness (NVH). One method to help reduce NVH is to dynamically balance high speed components of these transmissions. Balancing of these high speed components can be difficult due to the manner in which these components interface with each other.

An accurate setting of taper roller bearings is critical to maximizing the fatigue life of the bearings and to provide proper shaft dynamic stability. Complicated and capital intensive tooling is often required to provide an arrangement adequate for setting the bearings.

SUMMARY

Various aspects of examples of the disclosure are set out in the claims.

According to a first aspect of a first embodiment, a planet gear carrier and output gear assembly is provided which comprises a generally cylindrical, annular planet carrier body configured for rotating about a horizontal axis and having a first axially facing mounting surface at one side thereof; a generally cylindrical output gear body configured for rotating about the horizontal axis and having a second axially facing mounting surface shaped complementary to, and being in engagement with said first axially facing mounting surface, and having a central opening including an interior surface disposed concentrically about said horizontal axis; a releasable fastener assembly securing the planet carrier body to said output gear body, with the first axially facing surface being held in tight engagement with the second axially facing surface; a plurality of planet pins spaced equal-angularly from each other about said rotation axis and respectively having first ends supported in the planet carrier body and second ends supported in the output gear body; said planet carrier body and said output gear body cooperating with each other to define a plurality of radially open clearance slots respectively radially aligned with said plurality of planet pins; and a plurality of planet gears being respectively mounted for rotation about said plurality of planet pins and respectively projecting through said plurality of radially open clearance slots.

According to a second aspect of the first embodiment the first aspect is further defined by including, a hollow spindle extending axially along, and concentrically to, said horizontal axis, the spindle having a cylindrical section projecting into the central opening of said output gear housing in radially spaced relationship to the interior surface; and said spindle further including an annular, radially extending mounting plate located axially between opposite ends of the spindle; inner and outer tapered roller bearings supporte said output gear body for rotating about the cylindrical section of the spindle, with outer races of the inner and outer tapered roller bearings being engaged with the interior surface of the output gear body at opposite sides of an annular shoulder defined by the interior surface, and with inner races of the inner and outer tapered roller bearings being engaged with the cylindrical section of the spindle.

According to a third aspect, the cylindrical section of the spindle of the second aspect is further defined by having a threaded inner end that extends beyond the inner race of the inner tapered roller bearing and terminates adjacent the first axially facing surface of the output gear body; and a spindle nut being threaded onto the threaded end of the spindle and into tight axial engagement with one of the inner race of the inner tapered roller bearing or with a spacer ring located between the spindle nut and the inner race of the inner tapered roller bearing.

According to a fourth aspect, the first and second axially faces of the carrier are further defined as being planar and located in a plane disposed at a right angle to the horizontal axis.

According to a fifth aspect, a planet carrier and output gear arrangement is provided which comprises: a carrier body including a generally cylindrical, annular disc configured for rotating about a horizontal rotation axis and to which is joined a plurality of axially extending tabs in the form of cylindrical segments disposed equal-angularly about the rotation axis and having co-planar, axially facing ends; an output gear body including a cylindrical ring having an axially facing planar end abutting said axially facing end of the cylindrical segments of the carrier body and further including an annular output gear formed thereabout; a plurality of axially extending releasable fasteners securing the carrier body to the output gear body thereby clamping the axially facing ends of the tabs against the planar end of said cylindrical ring; a plurality of axially extending planet pins being fixed in said annular disc and in the cylindrical ring at equal-angularly spaced locations from each other and from the plurality of tabs; and a plurality of planet gears being respectively mounted for rotation about said planet pins.

These and other aspects of the invention will be apparent from a reading of the ensuing description together with the appended drawings.

BRIEF DESCRIPTION OF THE DRAWINGS

The detailed description of the drawings refers to the accompanying figures in which.

DETAILED DESCRIPTION OF THE DRAWINGS

Figure 1:
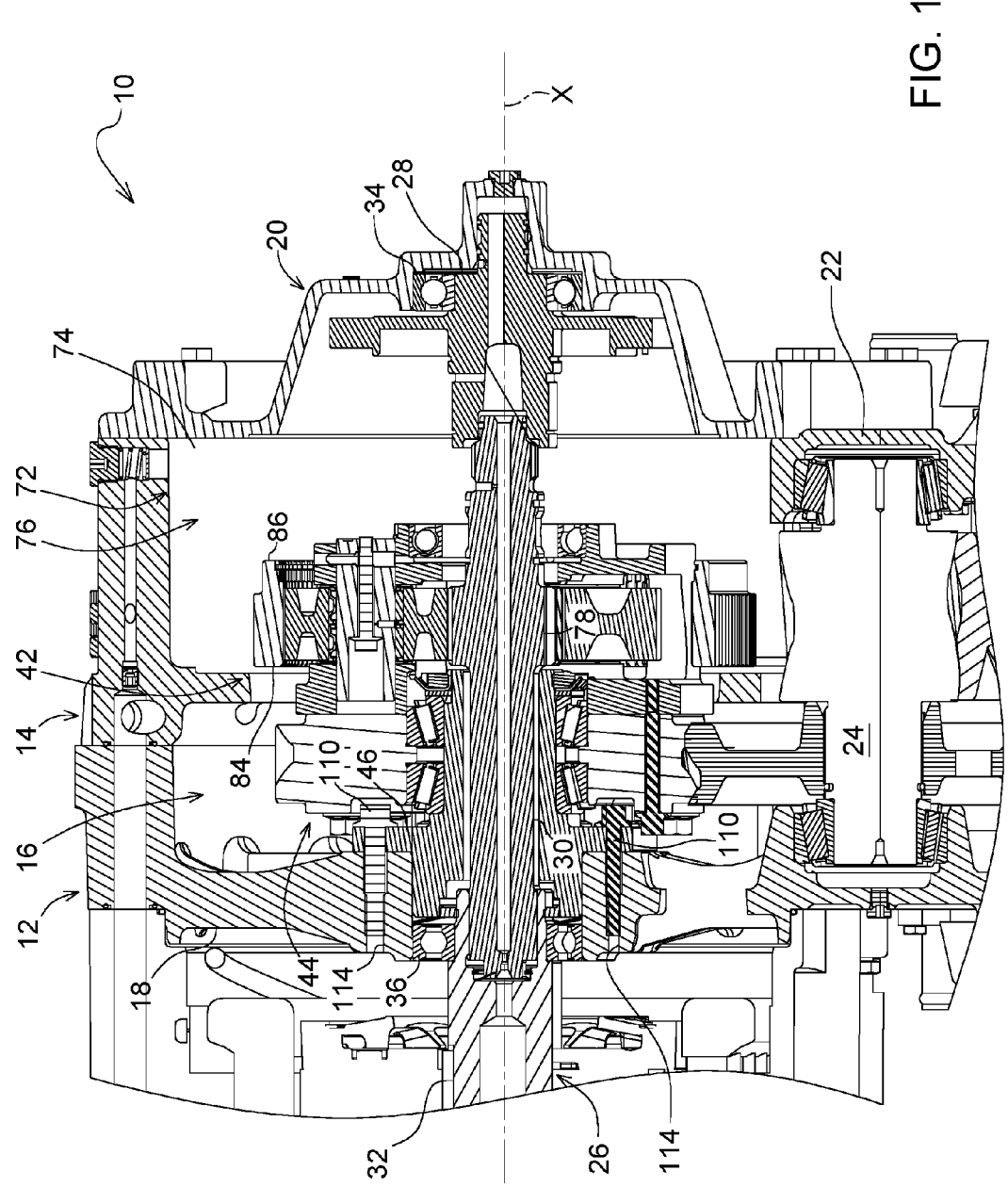
FIG. 1 is a longitudinal sectional view of a portion of a transmission embodying the planet carrier, output gear and spindle joined to form a modular unit comprising the present invention.
Figure 2:
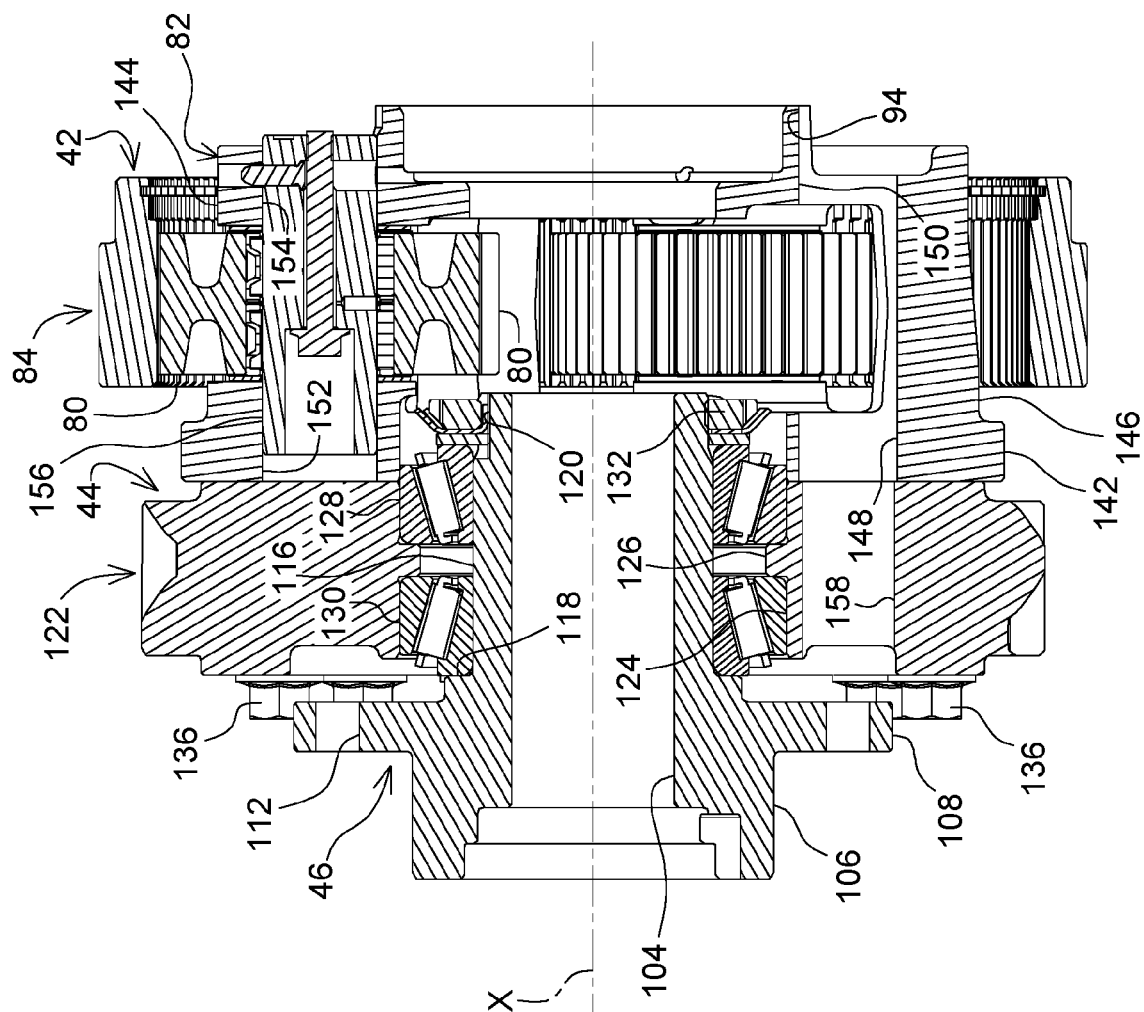
FIG. 2 is an enlarged vertical sectional view showing the transmission structure comprising the modular unit of FIG. 1 removed from the transmission housing.
Figure 3:
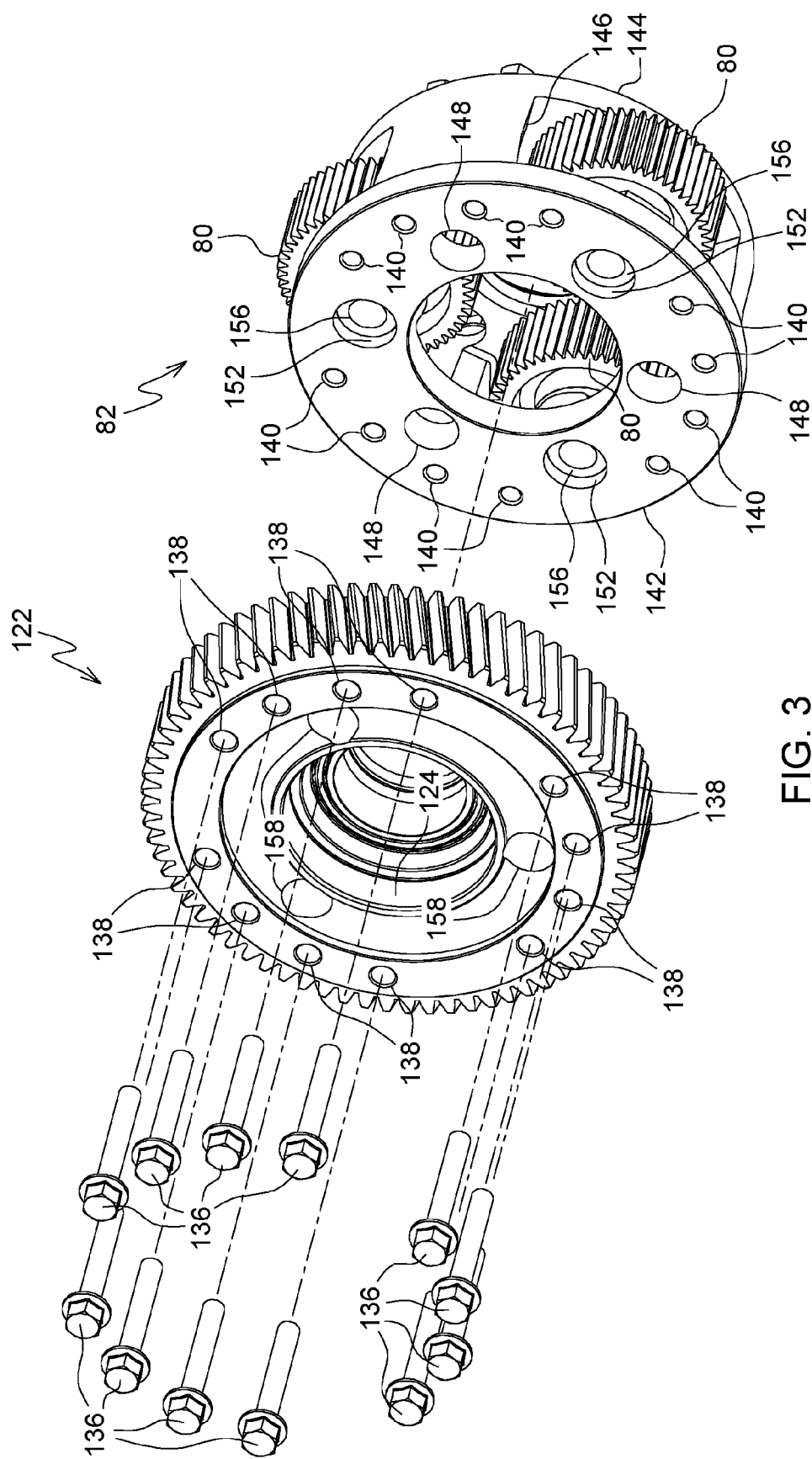
FIG. 3 is an exploded left end perspective view of the planet carrier and output gear assembly of the invention shown removed from the portion of the transmission shown in FIG. 2, but excluding the spindle and tapered roller bearing arrangement.
Figure 4:
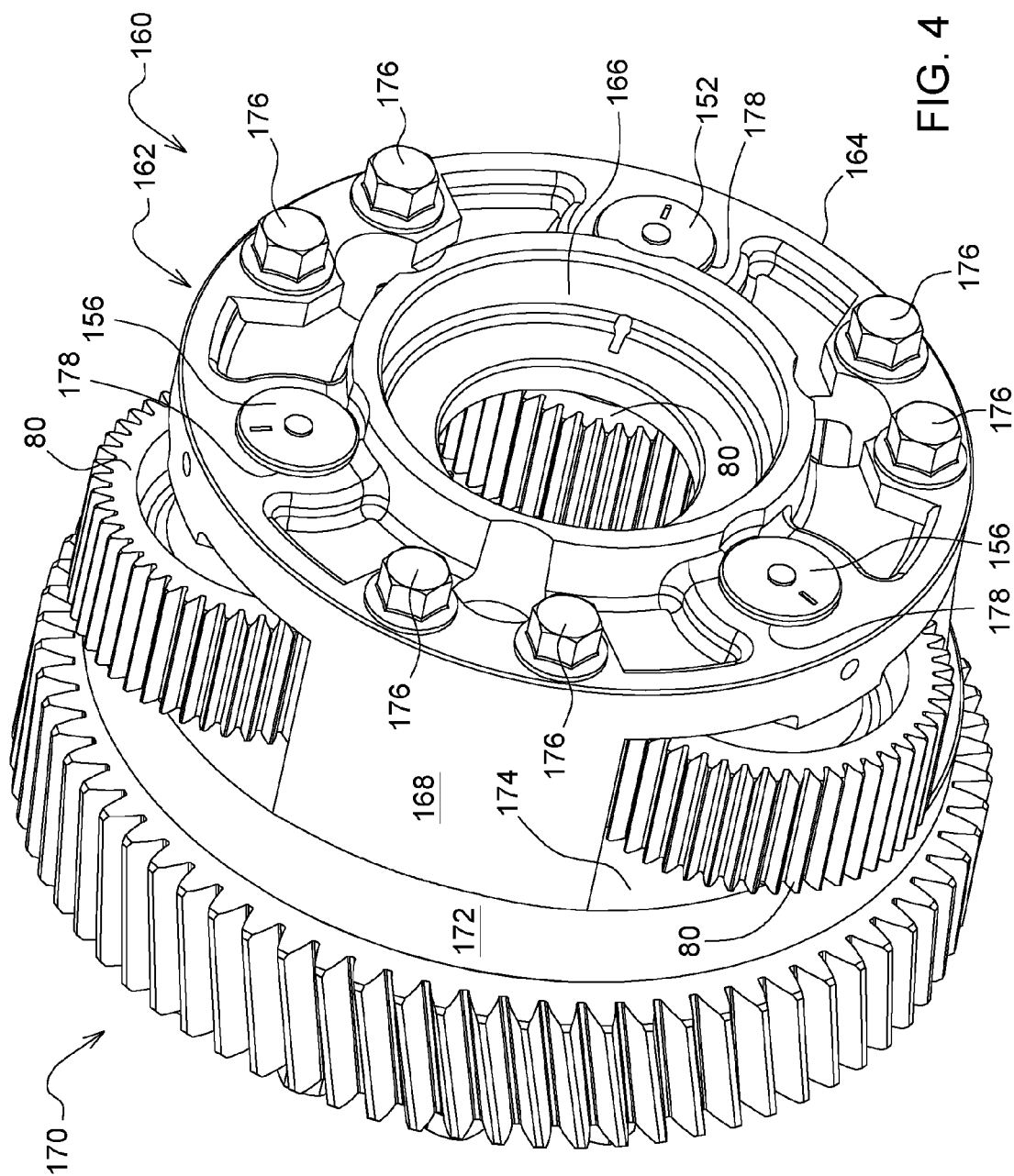
FIG. 4 is a right end perspective view of an alternate embodiment of the combined planet carrier and output gear of the present invention.

At least one example embodiment of the subject matter of this disclosure is understood by referring to FIGS. 1 through 3 of the drawings, with a second embodiment of the combined planetary carrier and output gear being understood from FIG. 4.

Referring now to FIGS. 1 and 2, there is shown a portion of a vehicle transmission 10 including a housing 12 having a right end housing section 14 defining a compartment 16 having a major upper region bounded at a left side by an interior wall 18 and bounded at a right side by a removable cap 20 for providing access to the compartment for permitting drive components to be mounted within, and removed from the compartment 16. A lower right end region of the housing section 14 defines a lower compartment region 22 in which is located a drop gear train, of which only an upper portion including an input shaft 24 carrying an input gear for receiving power from a transmission output gear is shown, the input shaft being coupled through a remaining part of the drop gear train (not shown) leading to a transmission output shaft (also not shown).

A transmission input power shaft 26 includes first, second and third shaft sections 28, 30 and 32, respectively, as considered from right to left, with the power shaft 26 extending along a horizontal rotation axis X. The first shaft section 28 is rotatably supported in the end cap 20 by a ball bearing assembly 34. The second shaft section 30 has a right end region received in a receptacle formed in a left end region of the first shaft section 28 and has a splined left end region received in an interiorly splined hollow cylindrical right end region of the third shaft section 32. The right end region of the third shaft section 32 is supported for rotation about the axis X by a ball bearing assembly 36 located in a left end region of a cylindrical opening 38 provided in the interior wall 18.

Located within the housing section 14 immediately leftward of the end cap 20 and continuing to a right side of a planetary gear set 42 are transmission components (not shown) which establish a drive connection between the input shaft 26 and the planetary gear set 42 in a manner generally known in the art and not forming any part of the present invention. As described in further detail below, the planetary gear set 42 imparts rotation to an output gear assembly 44 supported for rotation about the rotation axis X by a spindle 46 disposed coaxially with the axis X and forming part of the output gear assembly 44.

The planetary gear set 42 includes a sun gear 78 formed integrally with the second shaft section 30, planet gears 80 (FIGS. 2 and 3) meshed with the sun gear 78 and mounted for rotation within a planet carrier 82, and a ring gear 84 having a set of internal gear teeth meshed with teeth of the planet gears 80.

The spindle 46 includes a stepped, cylindrical bore 104 (FIG. 2) extending axially through the spindle in concentric relationship to the rotation axis X. A left end region 106 of the spindle 46 is cylindrical and is tightly received in the cylindrical wall opening 38 at a location just rightward of the ball bearing assembly 36. The spindle 46 includes a radially projecting, annular mounting flange 108 having a base joined to a right end of the cylindrical end region 106 and having a planar, axially leftward facing, annular mounting surface held in tight engagement with a complementary annular mounting surface of the interior wall 18 by a plurality of mounting bolts 110 respectively extending leftwardly through a plurality of holes 112 provided in a circular pattern in the flange 108 and screwed into respective threaded bores 114 provided in the wall 18 in axial alignment with the holes 112. The spindle 46 further includes a tubular portion which extends rightwardly from the mounting flange 108 and defines a cylindrical outer surface 116 having a left end joined to an upward step defining an annular abutment surface 118 and having a right end joined to a downward step leading to a threaded right end section 120 of the spindle.

The output gear assembly 44 includes an output gear 122 having a central cylindrical opening 124 disposed in concentric, radially outward spaced relationship to the spindle surface 116 and defining a radially inwardly projecting annular abutment shoulder 126 located between opposite ends of the opening 124. Supporting the output gear 122 for rotation about the spindle surface 116 are right and left, tapered roller bearings 128 and 130, respectively, having outer races respectively tightly received in opposite end regions of the central opening 124 of the output gear 122 and engaged with opposite annular sides of the annular abutment shoulder 126. Inner races of the bearings 128 and 130 are received on the spindle surface 116. A left side of the inner race of the left bearing 130 is engaged with the abutment surface 118 of the spindle 46. A ring nut 132 is threaded onto the threaded end 120 of the spindle 46 and either directly engages a right surface of the inner race of the right tapered roller bearing 128 or engages a single washer 134, as shown, or a stack of such washers 134, serving as a shim or shims and being sandwiched between the ring nut 132 and the inner race of the right tapered roller bearing 128. In this way, the bearings 128 and 130 are correctly set for smooth operation.

The output gear 122 has a planar annular right side surface engaged with a planar annular left side surface of the second stage planet carrier 82, with the planet carrier 82 and output gear 122 being secured together to form a unit by a plurality of bolts 136, which are, as can best be seen in FIG. 3, respectively inserted into a plurality of holes 138 extending axially through the output gear 122 and are respectively threaded into axially aligned threaded bores 140 provided in a first or left annular plate portion 142 of the carrier 82, noting that the opposite side of the carrier 82 is formed as part of a second or right annular plate portion 144, with these plate portions 142 and 144 being joined at an outer circumference thereof by three axially extending, equal-angularly spaced, cylindrical annular segments 146 centered between the gears 80. Further, it is noted that the plate portions 142 and 144 respectively contain first and second sets of three equal-angularly spaced access holes 148 and 150, with the set of holes 148 being respectively axially aligned with the set of holes 150. Each of the plate portions 142 and 144 also respectively contain sets of three equal-angularly spaced planet pin mounting holes 152 and 154, with the set of holes 152 respectively being axially aligned with the set of holes 154. The axially aligned sets of planet pin mounting holes 152 and 154 are angularly indexed so as to be equally spaced from the three axially aligned sets of access holes 148 and 150, with each of the axially aligned sets of planet pin mounting holes 152 and 154 respectively receiving left and right end portions of a planet pin 156.

It is here noted that the three planet pins 156 are respectively radially centered relative to three radial openings respectively defined between adjacent ones of the three annular segments 146 and that these radial openings respectively provide clearance for, and receive, radially outer portions of the three planet gears 80.

The output gear 122 contains three equal-angularly spaced access holes 158 that are respectively axially aligned with the three sets of axially aligned access holes 148 and 150 provided in the planet carrier 82 when the carrier and output gear 122 are bolted together. The radial location of the access holes 148, 150 and 158 corresponds to the radial location of the mounting bolts 110 that secure the spindle 46 to the interior wall 18. This makes it possible when assembling or disassembling the transmission 10 to assemble or disassemble, as a unit, a subassembly comprising the second shaft section 30, the spindle 46, tapered roller bearings 128 and 130, output gear 122 and planet carrier 82 together with the planet gears 80 by placing a set of the access holes 148, 150 and 158 in respective axial alignment with the bolts 110 so that a tool may be inserted through the access holes and used to remove the bolts 110.

Also, it makes it possible during assembly of the transmission 10 to first assemble a subassembly or rotating parts comprising the second shaft section 30, the spindle 46, tapered roller bearings 128 and 130, output gear 122 the and planet carrier 82 and to dynamically balance this subassembly of rotating parts as a unit on a conventional dynamic balancing machine, noting that the low number of parts comprising the bearing subassembly aids in reducing the setting complexity for achieving the precision required for smooth operation.

Referring now to FIG. 4, a combined planet carrier and output gear assembly 160 is shown, which is an alternative embodiment of the combined planet carrier 82 and output gear 122, with the difference being that the output gear is constructed to form part of the planet carrier. Specifically, in this embodiment, a planet carrier 162 includes a right annular plate portion 164 similar in most respects to the right annular plate portion 144 of the first-described embodiment. Joined to, and projecting leftwardly from an outer periphery of the plate portion 164 are three axially projecting, equal-angularly spaced, tabs formed as cylindrical annular segments 168 having left ends (not visible) which terminate in a plane disposed perpendicular to the rotation axis X. An output gear 170 includes an integral annular plate 172 projecting axially to the right and having a right annular surface 174 arranged at the same radial location as the left ends of the segments 168. A pair of bolts 176 project axially to the left through a set of holes (not visible) extending through the plate portion 164 and through each of the segments 168 and are threaded into axially aligned threaded bores (not visible) provided in the annular surface 174 of the output gear 170. Right end portions of the planet pins 156 are located in respective pin mounting holes 178 provided in the right annular plate portion 164 with the left end portions of the pins (not shown) being located in respective bores (also not shown) provided in the annular surface 174 of the annular plate 172 formed integrally with the body of the output gear 170. Thus, the annular plate 172 cooperates with the annular plate portion 164 to support the planet pins 156 and thus to define part of the planet carrier 162. Three equal angularly spaced access holes 180 extend axially through the carrier 162 at three locations respectively spaced equally from the planet pin mounting holes 178, these access holes being axially aligned with similar holes (not shown) provided in the output gear 170 for gaining access for installing or removing the bolts 110 for assembling or disassembling the spindle 46 to the transmission housing wall 18.

The operation, assembly and disassembly of the combined planet carrier and output gear assembly 160 are the same as that described above for the combined planet carrier 82 and output gear 122.

While the above describes example embodiments of the present disclosure, this description should not be viewed in a limiting sense. Rather, there are several variations and modifications which may be made without departing from the scope of the present invention as defined in the appended claims.

What is claimed is:

1. A planet gear carrier and output gear assembly, comprising:
   a generally cylindrical, annular planet carrier body having a first axially facing surface;
   a generally cylindrical, annular output gear body having a second axially facing surface engaging said first axially facing surface;
   said planet carrier body and output gear body each being configured for rotating about a horizontal axis;
   said planet carrier body including a first annular plate portion formed as an integral part of said planet carrier body;
   said output gear body including a second annular plate formed as an integral part of the output gear body; and
   a releasable fastener assembly securing the planet carrier body to said output gear body, with the first axially facing surface being held in tight engagement with the second axially facing surface.

2. A planet gear carrier and output gear assembly, comprising:
   a generally cylindrical, annular planet carrier body having a first axially facing surface;
   a generally cylindrical, annular output gear body having a second axially facing surface engaging said first axially facing surface;
   said planet carrier body and output gear body each being configured for rotating about a horizontal axis;
   said planet carrier body including first and second, axially spaced annular plate portions, with the first annular plate portion being formed one of as an integral part of said planet carrier body and as an integral part of said output gear body;
   a releasable fastener assembly securing the planet carrier body to said output gear body, with the first axially facing surface being held in tight engagement with the second axially facing surface;
   said gear body having a central cylindrical opening extending axially therethrough and including a cylindrical interior surface;
   a hollow spindle extending axially along, and concentrically to, said horizontal axis, the spindle having a cylindrical section projecting into the central opening of said output gear body in radially spaced relationship to the interior surface; and
   said spindle further including a radially extending mounting plate located axially between opposite ends of the spindle, the mounting plate being adapted for engagement with an axially facing surface of an upright transmission housing wall and containing a plurality of axially extending mounting holes spaced angularly from each other about the rotation axis and adapted for respectively receiving a plurality of mounting bolts for fixing the mounting plate to the housing wall;
   inner and outer tapered roller bearings supporting said output gear body for rotating about the cylindrical section of the spindle, with outer races of the inner and outer tapered roller bearings being engaged with the interior surface of the output gear body at opposite sides of an annular shoulder defined by the interior surface, and with inner races of the inner and outer tapered roller bearings being engaged with the cylindrical section of the spindle.

3. The planet gear carrier and output gear assembly, as defined in claim 2, wherein the cylindrical section of the spindle has a threaded inner end that extends beyond the inner race of the inner tapered roller bearing and terminates adjacent the first axially facing surface of the output gear body; and a spindle nut being threaded onto the threaded end of the spindle and into tight engagement with one of the inner race of the inner tapered roller bearing or with an annular spacer located between the spindle nut and the inner race of the inner tapered roller bearing.

4. The planet gear carrier and output gear assembly, as defined in claim 2, wherein the carrier body includes a first plurality of axially extending access holes arranged in angularly spaced relationship to each other about the horizontal axis and wherein the output gear body includes a second plurality of axially extending access holes respectively arranged in axially aligned relationship with the first plurality of access holes and with the mounting holes provided in the mounting plate of the spindle, whereby a tool may be inserted through the axially aligned first and second access holes for engaging mounting bolts for either bolting the mounting plate to, or disconnecting the mounting plate from, the upright transmission wall.

5. The planet gear carrier and output gear assembly, as defined in claim 1, wherein said first and second axially facing surfaces are each planar and disposed in a plane disposed at a right angle to the horizontal axis.

6. The planet gear carrier and output gear assembly, as defined in claim 1, wherein one of said planet gear carrier body and said output gear body includes a plurality of equal-angularly spaced tabs extending axially into engagement with another of said planet gear carrier body and said output gear body, and with said tabs having axially facing surfaces defining at least a portion of one of said first and second axially facing surfaces.

7. The planet gear carrier and output gear assembly, as defined in claim 6, wherein each of said plurality of equal-angularly spaced tabs has angularly spaced, first and second side surfaces which bound each of adjacent ones of the angularly spaced clearance spaces.

8. The planet gear carrier and output gear assembly, as defined in claim 6 wherein a plurality of fasteners project axially through each of said plurality of tabs of one of said planet gear body and said output gear body and are respectively received in threaded holes provided in the other of said planet gear body and said output gear body.

9. A planet gear carrier and output gear assembly, comprising:

a carrier body including a first generally cylindrical, annular plate portion configured for rotating about a horizontal rotation axis and to which is joined a plurality of equal angularly spaced, axially extending tabs, with the tabs each being in the form of an annular cylindrical segment disposed about said rotation axis and respectively having a co-planar, axially facing ends;

an output gear body having output gear teeth formed annularly thereabout and including a second annular plate portion having an axially facing planar end abutting said axially facing ends of the cylindrical segments of the carrier body;

a plurality of axially extending bolts securing said carrier body to said output gear body and clamping said axially facing ends of the tabs against the planar end of said second annular plate portion;

a plurality of axially extending planet pins having opposite end portions respectively fixed in said first and second annular plate portions at equal-angularly spaced locations from each other and from the plurality of tabs; and a plurality of planet gears being respectively mounted for rotation about said planet pins.

10. The planet gear carrier and output gear assembly, as defined in claim 9, wherein said output gear body further includes an inside diameter defining axially spaced, inner and outer bearing mount surfaces separated by an annular gear body shoulder, with the axially inner bearing mount surface being between the shoulder and the planet carrier body;

first and second tapered roller bearings having respective outer races engaged with the inner and outer bearing mount surfaces and with opposite sides of said annular gear body shoulder;

a spindle having an axially extending cylindrical section received in respective inner races of said inner and outer tapered roller bearings, with the spindle being adapted for being fixed from rotating thereby supporting said carrier body and said output gear body for rotation about said rotation axis.

11. The planet gear carrier and output gear assembly, as defined in claim 10, wherein said spindle has an annular spindle shoulder abutting an axially outer end of said inner race of said second tapered roller bearing, with the spindle further having an axially inner threaded end region that extends inwardly past an axially inner end of the inner race of said first tapered roller bearing; and a spindle nut being received on said spindle threaded end region and being tightened against the inner race of the first tapered roller bearing so as to draw the spindle shoulder against the inner race of the second tapered roller bearing and thereby seat the respective outer races of the inner and outer tapered roller bearings against the gear body shoulder.

12. The planet gear carrier and output gear assembly, as defined in claim 10, and further including a drive shaft extending axially through said spindle and having a sun gear fixed thereto and meshed with the planet gears.

13. A transmission subassembly, adapted for being dynamically balanced prior to being installed in a transmission, comprising:

a planet gear carrier body and an output gear body being releasably secured together in side-by-side relationship to form a combined body configured for rotation about a horizontal rotation axis;

a plurality of planet pins supported within the combined body so as to be parallel to, and in an equal angular distribution about, the horizontal axis;

a plurality of planet gears respectively rotatably mounted on said plurality of planet pins;

a hollow spindle, adapted for being fixed within a transmission housing, being disposed in concentric relationship to said horizontal axis and including a cylindrical section projecting axially through the output gear body;

the output gear body having an interior surface disposed in concentric relationship to an outer cylindrical surface of the cylindrical section of the spindle; and first and second tapered roller bearings having outer races engaged with the interior surface of the output gear body and having inner races engaged with the outer cylindrical surface of the cylindrical section of the spindle.

\* \* \* \* \*